US008543585B2

(12) United States Patent
Townsend

(10) Patent No.: US 8,543,585 B2
(45) Date of Patent: Sep. 24, 2013

(54) METHODS AND DEVICES FOR ANALYSIS OF CARBON FOOTPRINTS

(75) Inventor: Stuart Townsend, Delta (CA)

(73) Assignee: Business Objects Software Ltd., Dublin (IE)

( * ) Notice: Subject to any disclaimer, the term of this patent is extended or adjusted under 35 U.S.C. 154(b) by 184 days.

(21) Appl. No.: 12/858,266

(22) Filed: Aug. 17, 2010

(65) Prior Publication Data

US 2011/0289082 A1 Nov. 24, 2011

Related U.S. Application Data

(60) Provisional application No. 61/346,751, filed on May 20, 2010.

(51) Int. Cl.
*G06F 7/00* (2006.01)
*G06F 17/30* (2006.01)

(52) U.S. Cl.
USPC .......................................................... 707/758

(58) Field of Classification Search
USPC .................................. 707/733, 758, 999.006
See application file for complete search history.

(56) References Cited

U.S. PATENT DOCUMENTS

| | | | | |
|---|---|---|---|---|
| 7,281,218 | B1 * | 10/2007 | Runge et al. | 715/769 |
| 2009/0198666 | A1 * | 8/2009 | Winston et al. | 707/5 |
| 2009/0254387 | A1 * | 10/2009 | Daken et al. | 705/7 |
| 2010/0042453 | A1 * | 2/2010 | Scaramellino et al. | 705/7 |
| 2010/0077020 | A1 * | 3/2010 | Paloheimo et al. | 709/203 |
| 2010/0249955 | A1 * | 9/2010 | Sitton | 700/33 |
| 2010/0280884 | A1 * | 11/2010 | Levine et al. | 705/13 |

OTHER PUBLICATIONS

"Carbon Footprint Calculator: Whats My Carbon footprint?", The Nature Conservancy, [Online]. Retrieved from the Internet: <URL: http://www.nature.org/initiatives/climatechange/calculator/>, (Accessed Aug. 17, 2010), 1 pg.

"CoolClimate Calculator", [Online]. Retrieved from the Internet: <URL: http://coolclimate.berkeley.edu/>, (Accessed Aug. 17, 2010), 2 pgs.

* cited by examiner

*Primary Examiner* — Alexey Shmatov

(74) *Attorney, Agent, or Firm* — Schwegman Lundberg & Woessner, P.A.

(57) ABSTRACT

In an embodiment, a method provides a carbon footprint comparison. In this method, a request to compare a first carbon footprint associated with a first user is received. Here, first profile attributes and the first carbon footprint associated with the first user are accessed. Additionally, second profile attributes associated with a second user are accessed. A match of a first number of the first profile attributes with a second number of the second profile attributes is identified. With the match, a strength of the match is calculated based on a number of identified matching profile attributes. A response to the request is then transmitted, and this response comprises the strength of the match and the first carbon footprint.

10 Claims, 8 Drawing Sheets

METHODS AND DEVICES FOR ANALYSIS OF CARBON FOOTPRINTS

CROSS-REFERENCES TO RELATED APPLICATIONS

This application claims the benefit of U.S. Provisional Application No. 61/346,751, filed May 20, 2010 and entitled "Profile Matching—Carbon Analysis," the disclosure of which is incorporated herein by reference.

FIELD

The present disclosure relates generally to environmental technologies. In an embodiment, the disclosure relates to methods and devices for the analysis of carbon footprints.

BACKGROUND

Currently, there are various websites that can calculate a person's carbon footprint, and a person that is interested in, for example, the amount of carbon dioxide generated in his daily life, may use such websites to identify his carbon footprint. Additionally, such websites typically display the carbon footprints of an average U.S. or world household along with the calculated carbon footprint of the person. However, these displayed statistics may not be particularly relevant to the person using such a website because such statistics are based on other people that may have very different lifestyles.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, graphical user interfaces, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques used in the analysis of carbon footprints. A carbon footprint is a measure of greenhouse gas emissions caused directly and/or indirectly by a person. In an example of an analysis technique, the carbon footprint of a particular user is compared with carbon footprints of other users. These other users used in the comparison are selected based on their profiles when compared to the particular user. From this comparison, users who have very similar or dissimilar profiles can be identified. As explained in more detail below, the strength of the match between users can be calculated based on similarities in the profiles.

Figure 1:
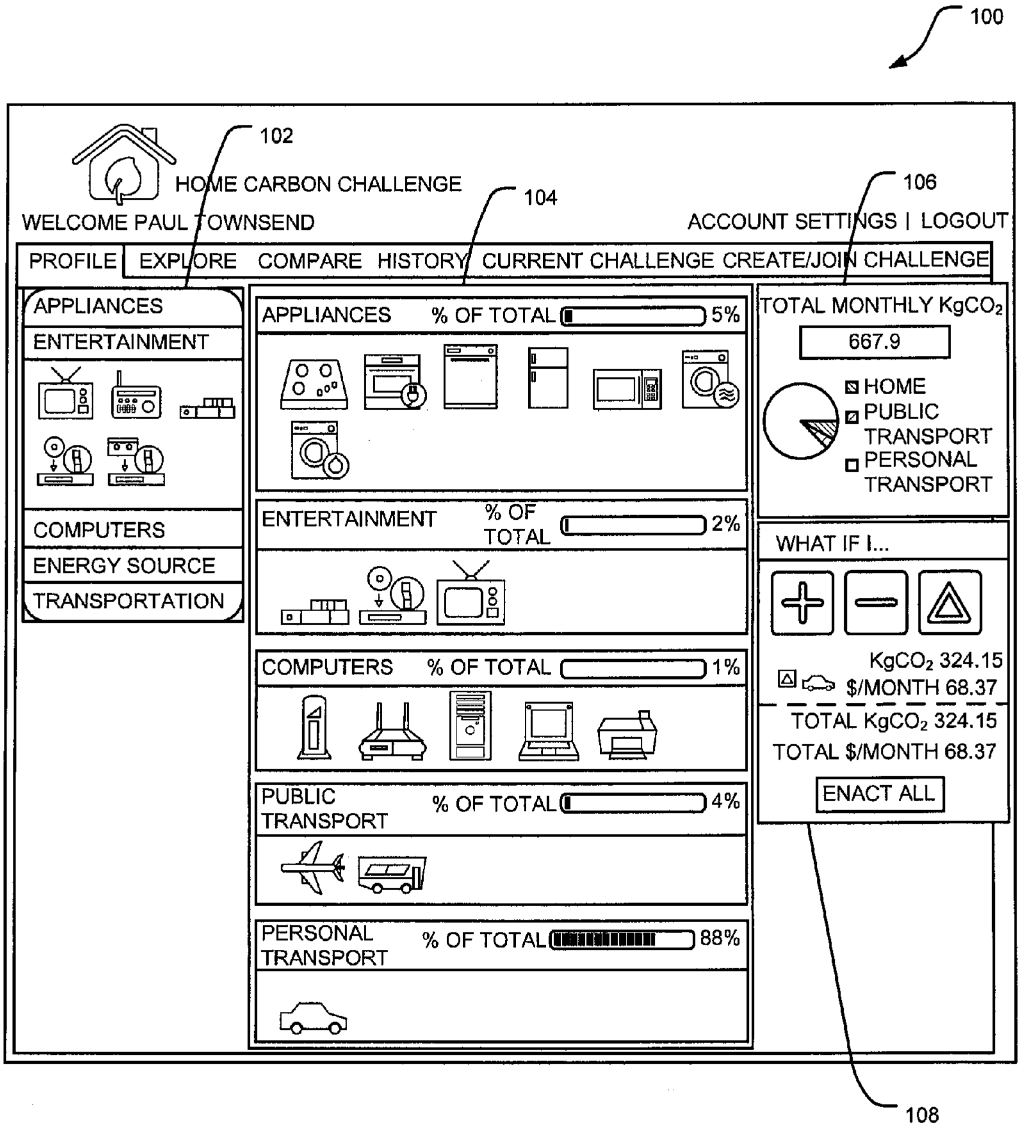
FIG. 1 is a graphical user interface (GUI) that displays a profile and a carbon footprint associated with a user, in accordance with an example embodiment.

FIG. 1 is a GUI 100 that displays a profile and a carbon footprint associated with a user, in accordance with an example embodiment. As depicted, the GUI 100 includes regions 102, 104, 106, and 108. Region 106 displays the carbon footprint that is based on a user's profile. Generally, a profile refers to a set of distinguishing attributes that define a mode of living associated with a user. These attributes may directly or indirectly cause emission of greenhouse gases. Examples of attributes include a number of household appliances owned by a user, a number of automobiles owned by a user, an amount of air travel use, a distance traveled by automobile to and from work, an amount of public transportation use, types of energy used at residence, and other attributes. Each attribute is defined by one or more numerical values, alphanumerical values, or other values. For example, an automobile attribute can be defined by a numerical value of three, which indicates a number of automobiles (three) owned by a particular user. In another example, a computer type attribute can be defined by an alphanumerical value of "laptop," which indicates a laptop computer owned by a particular user. An "attribute" may also be referred to as a "profile attribute," and accordingly, the terms "attribute" and "profile attribute" may be used interchangeably.

The GUI 100 is rendered on a video display unit and a user may define his profile through interaction with regions 102 and 104 of the GUI 100. In particular, the region 102 displays a selection of icons, each of which represents a unique profile attribute. That is, region 102 provides a user access to icons that represent a selection of profile attributes. In contrast, region 104 defines the actual profile of a user and therefore, includes or displays a number of profile attributes that define the profile of the user. The difference between region 102 and region 104 is that region 104 displays all user's profile attributes while region 102 provides a palette of different attributes that are not necessarily associated with the particular profile of the user.

To define his profile, a user can select one of many profile attributes attributable to him from region 102, and such a selection is displayed in region 104. In one example embodiment, if a user wants to add a profile attribute to his profile, he can select an icon, which represents that particular profile attribute, from region 102 and drag the icon from region 102 to region 104. As an example, a user may own a television. To include this television in his profile, the user locates and selects an icon that depicts a television from region 102 and drags this icon from region 102 to region 104. As a result, region 104 displays the icon depicting the television, thereby indicating that the television is now a part of the user's profile.

In another example, the user can define his mode of transportation by similarly locating and selecting an icon that represents public transportation (e.g., an image of a bus or train) from region 102 and dragging this icon from region 102 to region 104.

Once the icons representing the profile attributes are displayed in the region 104, the user can select each icon to further define parameters or properties associated with the profile attribute. In one example, a user can select an icon that represents a television from region 104, and this selection results in a pop-up window (not shown) that further displays properties of the television, such as the television screen size and the television type (e.g., plasma or liquid crystal display (LCD)). The user can edit or change this property through the pop-up window. In another example, the user can select an icon that represents a car from region 104, and this selection results in another pop-up window (not shown) that further displays properties of the car, such as the average fuel consumption. In this example, the pop-up window may display predefined properties of the car, but the user can also change these predefined properties through the pop-up window.

Region 106 defines and displays a user's carbon footprint, which is calculated based on the user's profile. Additionally included in GUI 100 is region 108 that allows a user to temporarily change his profile such that he can see the effect of the change on his carbon footprint. In one embodiment, a user can temporarily add or subtract a particular profile attribute from his profile by interacting with regions 104 and 108. As an example, if the user wants to see his impact on his carbon footprint by not driving his car, the user can select and drag an icon representing his car from region 104 into the "-" icon included in region 108. As a result of the profile change, namely the subtraction of this car from his profile, region 106 shows a newly calculated carbon footprint. In another example, the user may want to drive his car less. Here, the user can select and drag the same icon representing his car from region 104 into the "Δ" icon included in region 108 such that the user can, for example, modify the distance driven per month.

The subtractions, additions, and changes made through interactions with region 108 are temporary such that the subtractions, additions, and changes do not permanently change the user's stored profile. As such, the user can interface with region 108 to test out different profiles without permanent modification of his stored profile. To permanently enact a "temporary" change, the user can select the button "enact all" included in region 108 to save his changed profile.

Figure 2:
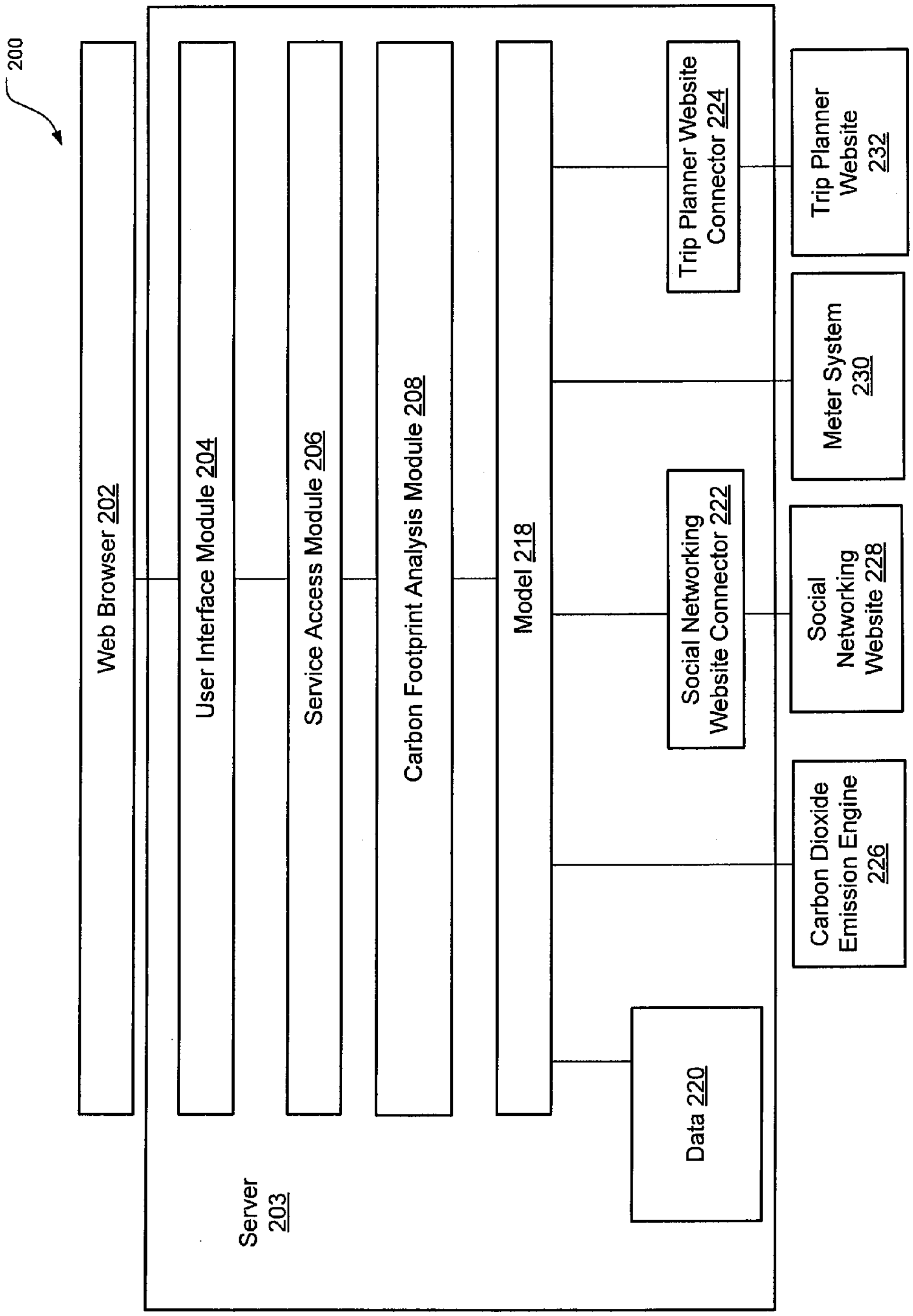
FIG. 2 depicts a block diagram of an architecture of a carbon analysis system, in accordance with an example embodiment.

FIG. 2 depicts a block diagram of an architecture of a carbon analysis system 200, in accordance with an example embodiment. As depicted, the carbon analysis system 200 includes a Web browser 202 in communication with a server 203 (such as an application server or a Web server). In the embodiment depicted in FIG. 2, the server 203 may be in communication with other services or sources of information provided by, for example, a carbon dioxide emission engine 226, a social networking website 228, a meter system 230, and/or a trip planner website 232.

Through the Web browser 202, a user can access the server 203 that provides functionalities associated with the analysis of carbon footprints. In the embodiment depicted in FIG. 2, the carbon analysis system 200 is a Web based application, but it should be appreciated that the carbon analysis system 200, in another embodiment, may also be a standalone system. As depicted, the server 203 includes a user interface module 204, a service access module 206, a carbon footprint analysis module 208, a model 218, various data 220, and connectors 222 and 224 to interface with various services or sources of information, such as the social networking website 228 and the trip planner website 232.

The user interface module 204 is configured to provide the GUIs for display in the Web browser 202. For example, the user interface module 204 may include JavaScript files, animation files, video files, and other components that provide a visible user experience in the Web browser 202.

The service access module 206 facilitates communication between the Web browser 202, the user interface module 204, and the service access module 206. In one example, the service access module 206 receives various requests from the user interface module 204 and routes the requests to the appropriate module included in the carbon footprint analysis module 208. In turn, the service access module 206 also receives and forwards responses from the carbon footprint analysis module 208 to the user interface module 204.

The carbon footprint analysis module 208 generally provides analysis functionalities associated with the analysis of carbon footprints. In one example, the carbon footprint analysis module 208 can calculate the carbon footprint of a particular user based on his profile. In another example, as explained in more detail below, the carbon footprint analysis module 208 can provide a carbon footprint comparison. It should be appreciated that the carbon footprint analysis module 208 provides some of these functionalities based on various data 220 stored in the model 218 (e.g., a database). Examples of such data include profile data, user data, meter data, challenge data, and reference data.

Still referring to FIG. 2, the carbon footprint analysis module 208 can interface with a variety of different services and sources of information, such as the carbon dioxide emission engine 226, the social networking website 228, the meter system 230, and the trip planner website 232. The carbon dioxide emission engine 226 includes a database of information about carbon dioxide emissions in the manufacture and use of household appliances, personal transport, and consumer goods. Such an engine provides the carbon footprint analysis module 208 with access to a set of standardized carbon dioxide data and calculations. A carbon footprint can be calculated based on this data. An application may be included in the social networking website 228 to interface with the carbon footprint analysis module 208. Such social networking website 228 may provide information regarding friends of a user. The meter system 230 includes a database of information about electrical consumption as collected by an electrical meter. The trip planner website 232 is a website for planning trips and may include various information regarding trips taken by users.

Figure 3:
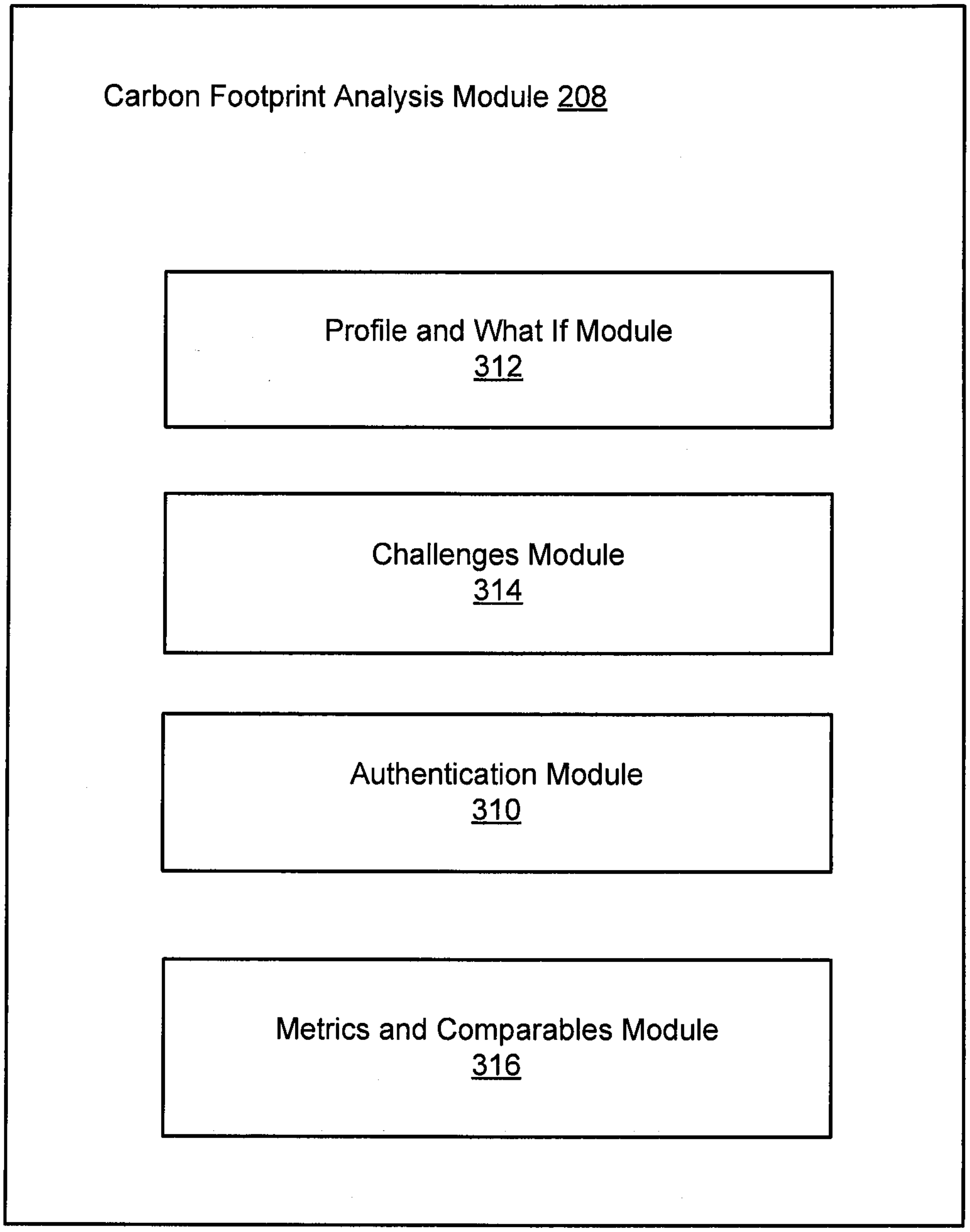
FIG. 3 depicts a block diagram of various components that may be included in the carbon footprint analysis module, in accordance with an example embodiment.

FIG. 3 depicts a block diagram of various components that may be included in the carbon footprint analysis module 208, in accordance with an example embodiment. As depicted, the carbon footprint analysis module 208 includes a profile and what if module 312, a challenges module 314, an authentication module 310, and a metrics and comparables module 316. The profile and what if module 312 is configured to calculate the carbon footprint of a user based on his profile and is configured to calculate a change in the carbon footprint based on changes in profile attributes, as described above. The authentication module 310 is configured to provide authentication-related functionalities, such as user login and data encryption.

The challenges module 314 is configured to implement a challenge to users where each user's carbon footprint is compared with each other's carbon footprint. For example, where a user elects to participate in this challenge, the challenges module 314 may display a ranking of his carbon footprint with the carbon footprints of other participating users.

The metrics and comparables module 316 is configured to provide a carbon footprint comparison between different users. For example, as explained in more detail below, the metrics and comparables module 316 can compare the carbon footprints between different users based on their profiles. In another example, the metrics and comparables module 316 can match one user with one or more other users based on their profiles, and can also calculate a strength of the match, as explained in more detail below.

It should be appreciated that in other embodiments, the carbon footprint analysis module 208 and the carbon analysis system 200 depicted in FIG. 3 and FIG. 2, respectively, may include fewer or more modules apart from those shown in FIG. 2 and FIG. 3. For example, in an alternate embodiment, the carbon analysis system 200 depicted in FIG. 2 may not have the capability to conduct a challenge, and therefore, the carbon footprint analysis module 208 depicted in FIG. 3 may exclude the challenges module 314.

Figure 4:
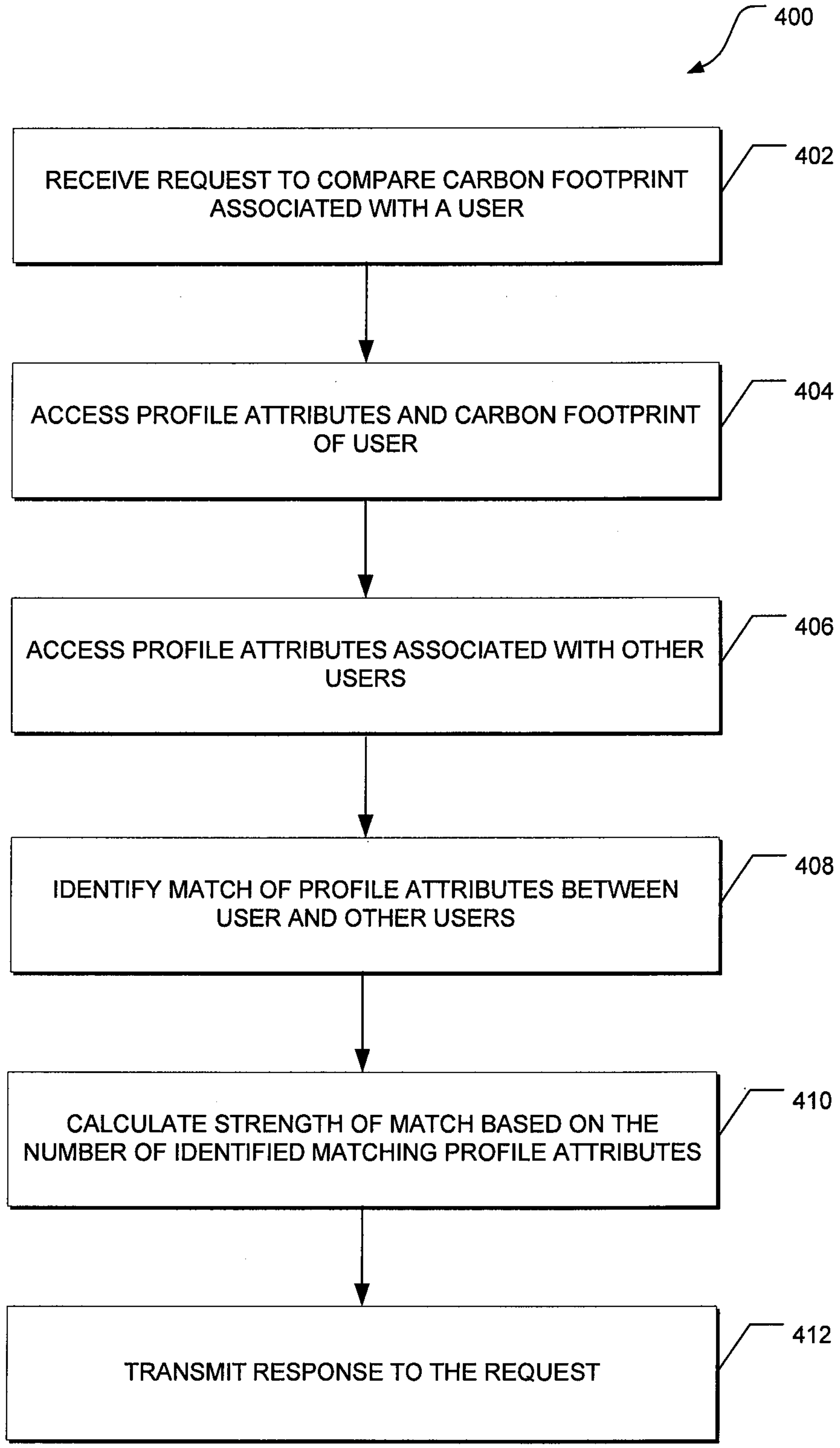
FIG. 4 depicts a flow diagram of a general overview of a method, in accordance with an example embodiment, for providing a carbon footprint comparison in the analysis of carbon footprints.

FIG. 4 depicts a flow diagram of a general overview of a method 400, in accordance with an example embodiment, for providing a carbon footprint comparison in the analysis of carbon footprints. In an example embodiment, the method 400 may be implemented by the carbon footprint analysis module 208 of FIG. 2 and employed in the server 203. As depicted in FIG. 4, a request to compare a carbon footprint associated with a particular user is received at 402. As an example, a Web browser may transmit such a request to a server when the user wants to make a carbon footprint comparison. With the receipt of the request, the profile attributes and carbon footprint associated with the user is accessed at 404. Additionally, profile attributes associated with other users are also accessed at 406. In one example, such access may include reading these profile attributes and carbon footprints from a database stored on a server.

With the profile attributes accessed, a match is identified at 408 between profile attributes of the user and the profile attributes of other users. In one embodiment, the match may be identified by comparing a profile attribute of the user with another profile attribute of another user to determine whether the two profile attributes match. A match can be identified between two profile attributes when a value of one profile attribute is equal to or correspond to a value of another profile attribute. For example, a user who owns the exact car as another user can be identified as having a match of cars, which is a type of profile attribute. However, a user who owns a sedan, a type of profile attribute, is not identified as having a match with another user who owns a truck. In another example, a profile attribute of three washing machines owned by one user matches the same profile attribute of three washing machines owned by a different user. However, a profile attribute of three washing machines owned by one user does not match the same profile attribute of ten washing machines owned by a different user.

In another embodiment, the match may be identified if the profile attributes of different users fall within a particular range. In this example, the profile attributes of different attributes are compared with a predefined range. All the profile attributes that fall within the predefined range are identified as a match. That is, a match can be identified between multiple profile attributes if their values fall within a predefined range. For example, if a predefined range is between 101-200 $m^2$, then a profile attribute, such as a square footage of a house, having a value of 150 $m^2$ is compared with the predefined range of 101-200 $m^2$. Since the value of 150 $m^2$ falls within the 101-200 $m^2$ predefined range, this profile attribute is identified as a match. Other profile attributes, such as a profile attribute having a value of 300 $m^2$, that fall outside of the 101-200 $m^2$ predefined range are not identified as having a match. In yet another example, if the predefined range is less than five, then a profile attribute, such as a number of people living in a household, having a value of two is identified as a match because two is less than five. However, a profile attribute having a value of six is not identified as having a match because six is greater than five.

With the match identified, a strength of the match is calculated at 410 based on a number of identified matching profile attributes. In one embodiment, the strength can be calculated by accessing a listing of predefined strengths and a number of matching profile attributes associated with each predefined strength. With this list, a number of identified matching profile attributes is matched to one of the number of matching file attributes in the listing. The predefined strength can be identified from the listing based on this matching. The following Table A illustrates an example of such a listing:

TABLE A

| | Country | Region | Residence Type | Residence Size | Number of Occupants |
|---|---|---|---|---|---|
| Level 5 (strong match) | Yes | Yes | Yes | Yes | Yes |
| Level 4 | Yes | Yes | Yes | Yes | No |
| Level 3 | Yes | Yes | Yes | No | No |
| Level 2 | Yes | Yes | No | No | No |
| Level 1 | Yes | No | No | No | No |
| Level 0 (poor match) | No | No | No | No | No |

As illustrated in Table A, the listing includes predefined strengths (levels 1-5) and a number of matching file attributes (country, region, residence type, residence size, and/or number of occupants) associated with each predefined strength. In one embodiment, the strength of the match can be calculated by matching the number of identified matching profile attributes between different users to one of the number of matching profile attributes in Table A. The predefined strength can then be identified from Table A based on the identification of the match. For example, a certain number of users only have one "country" profile attribute that is identified to match with a particular user. In reference to Table A, this "country" profile attribute is compared with the each row in Table A to identify a row with only a "country" profile match. The row associated with only one "country" profile attribute match is associated with a predefined strength of Level 1. As a result, the strength of the match between users that only have the "country" profile attribute in common with a certain user is Level 1. In another example, another number of users may have all five profile attributes (country, region, residence type, residence size, and number of occupants) that match the profile attribute of a user. As depicted in Table A, the row associated with all five matching profile attributes is associated with a predefined strength of Level 5. Therefore, the strength of the match between users that have all five profile attributes in common is Level 5.

As illustrated in Table A, the strength assigned to each match can be based on the number of matching profile attributes. That is, the strength can be directly dependent on a number of matching profile attributes. In one embodiment, a large number of matching profile attributes has a higher strength when compared to a small number of matching profile attributes. In other words, a "first" predefined strength from a listing has a higher strength when compared to a "second" predefined strength from the same listing if the number of matching profile attributes associated with the "first" predefined strength is larger than the number of matching profile attributes associated with the "second" predefined strength. In the example of the listing depicted in Table A, a Level 5 strength, which indicates a strong match, has more matching profile attributes (country, region, residence type, residence size, and number of occupants) when compared to the profile attributes (country and region) associated with a Level 2 strength, which indicates a weaker match.

In one embodiment, users can be grouped together based on their calculated strength of match. For example, a number of users having similar or identical strengths may be grouped together. Since each user is assigned a carbon footprint, each grouping of users has a number of associated carbon footprints, and an average carbon footprint can be calculated from these number of associated carbon footprints. In other words, an average of these carbon footprints associated with a particular grouping can be calculated. As an example, the calculation may include taking the average of all carbon footprints of other users that have an identical Level 5 strength. In another example, the calculation may include taking the average of all carbon footprints of other users that have an identical Level 4 strength.

With the strength of the match calculated, a response to the request is then transmitted at 412. In one embodiment, the response may include at least the strength of the match and the carbon footprint of the user as identified in the request. For example, in response to receipt of a request from a Web browser for a carbon footprint comparison, a server transmits a response with the carbon footprint of the user, carbon footprints of other users, the strength of the match between the user and other users, and/or the average carbon footprint associated with each grouping. As explained in more detail below, the strength of the match and the carbon footprints may be used in comparisons between users.

Figure 5:
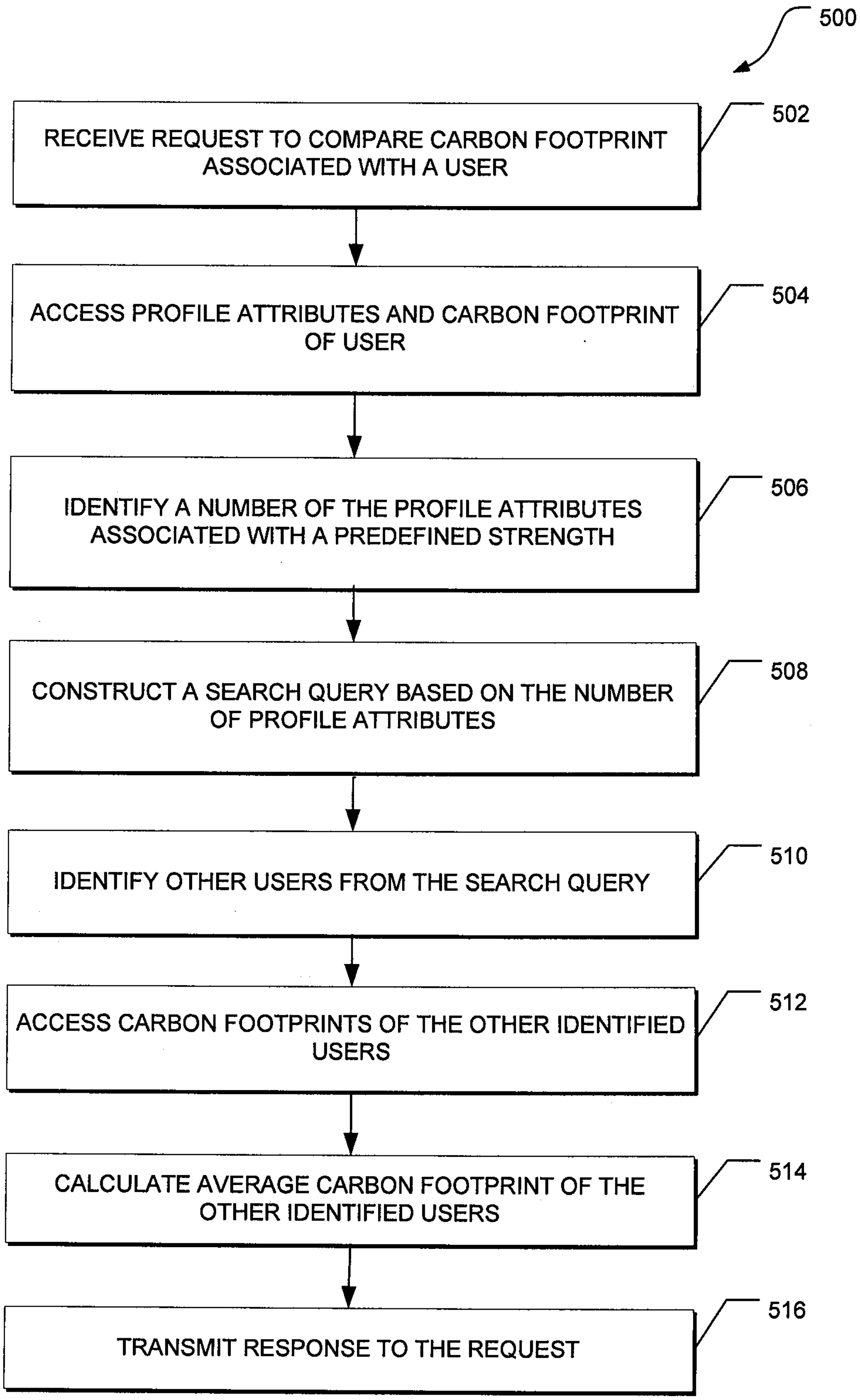
FIG. 5 depicts a flow diagram of a general overview of another method, in accordance with another example embodiment, for providing a carbon footprint comparison.

FIG. 5 depicts a flow diagram of a general overview of another method 500, in accordance with another example embodiment, for providing a carbon footprint comparison. This method 500 may be implemented by the carbon footprint analysis module 208 of FIG. 2 and employed in the server 203. As depicted in FIG. 5, a request to compare a carbon footprint associated with a particular user is received at 502. With receipt of this request, the profile attributes and carbon footprint of the user is accessed at 504.

With the profile attributes accessed, a number of the profile attributes that are associated with a predefined strength is identified at 506. For example, if a certain predefined strength is defined by a match of six different profile attributes, then those six different profile attributes are identified from the profile attributes associated with the user. In another example, a predefined strength of Level 2 is defined by a match of two different profile attributes, namely a number of dishwashers and a number of televisions. As such, a number of profile attributes of the user (the number of dishwashers and the number of televisions) are identified to be associated with the predefined strength of Level 2. In one embodiment, the identification can be made by accessing matching profile attributes associated with or that define a particular predefined strength, and comparing the profile attributes of the user with the accessed matching profile attributes. The number of the profile attributes that matches the matching profile attributes can be identified from the comparison.

A search query may then be constructed at 508 based on the number of profile attributes identified. A "search query," as used herein, refers to an enquiry about data (e.g., users and profile attributes). The terms included in the search query may include words, numbers, symbols, and other alphanumeric characters. In one example, a search query may be an enquiry to locate all other users that have profile attributes that match the identified profile attributes associated with a particular predefined strength. As explained previously, the match may be an exact match or based on whether the profile attributes fall within a particular range.

From the search query, other users can be identified or located at 510, and the carbon footprints of these identified users are accessed at 512. The average carbon footprint of these other identified users can be calculated at 514. In one example, the calculated average carbon footprint is associated with a particular predefined strength because, as discussed above, the search query is constructed from profile attributes associated with the particular predefined strength.

With the average carbon footprint calculated, a response to the request is transmitted at 514. In this embodiment, the response includes the strength of the match, the average carbon footprint of users for the particular grouping, and/or the carbon footprint of the particular user identified in the originally transmitted request. It should be appreciated that some or all the operations 502-516 may be repeated for a next predefined strength such that, for example, the average carbon footprint for each strength can be identified or calculated.

Figure 6:
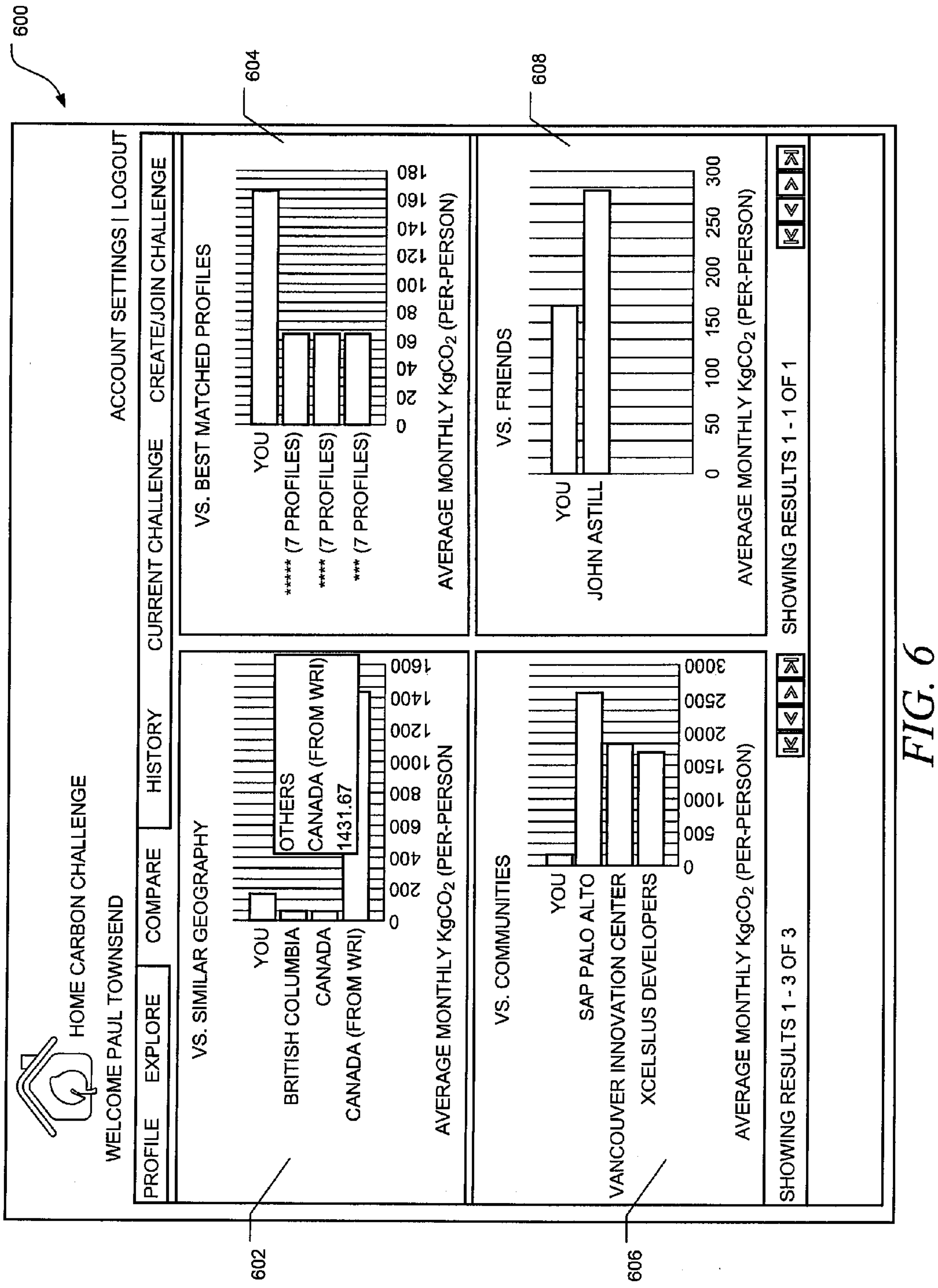
FIG. 6 is a GUI depicting various types of carbon footprint comparisons, consistent with example embodiments.

FIG. 6 is a GUI 600 depicting various types of carbon footprint comparisons, consistent with example embodiments. As depicted, the GUI 600 includes four different regions 602, 604, 606, and 608. Various data, such as carbon footprint, average carbon footprint, profile attributes, and strengths of matches can be used in the carbon footprint comparison. For example, regions 602 and 606 depict carbon footprint comparisons based on similar geography or community. In particular, the comparison is between the average monthly carbon footprint of a particular user ("you") with the average monthly carbon footprint of other users that live in a particular geography or community, such as British Columbia, Canada, Palo Alto, and Vancouver innovation center. In another example, region 608 displays a comparison of the carbon footprint of a friend. In particular, the graphical user region 608 displays the average monthly carbon footprint of a particular user ("you") simultaneously with the average monthly carbon footprint of the user's friend, John Astill.

Instead of comparisons based on a single profile attribute, region 604 displays comparisons between the carbon footprint of the user and average carbon footprints of similarly matched profiles. In this example, the comparison is between a particular user ("you") with the average carbon footprints of other users that are grouped based on the strength of the match. For example, as depicted in region 604, the average carbon footprints of three different strength levels, which are identified by the number of "*" characters, are displayed along with the carbon footprint of the user ("you").

Figure 7:
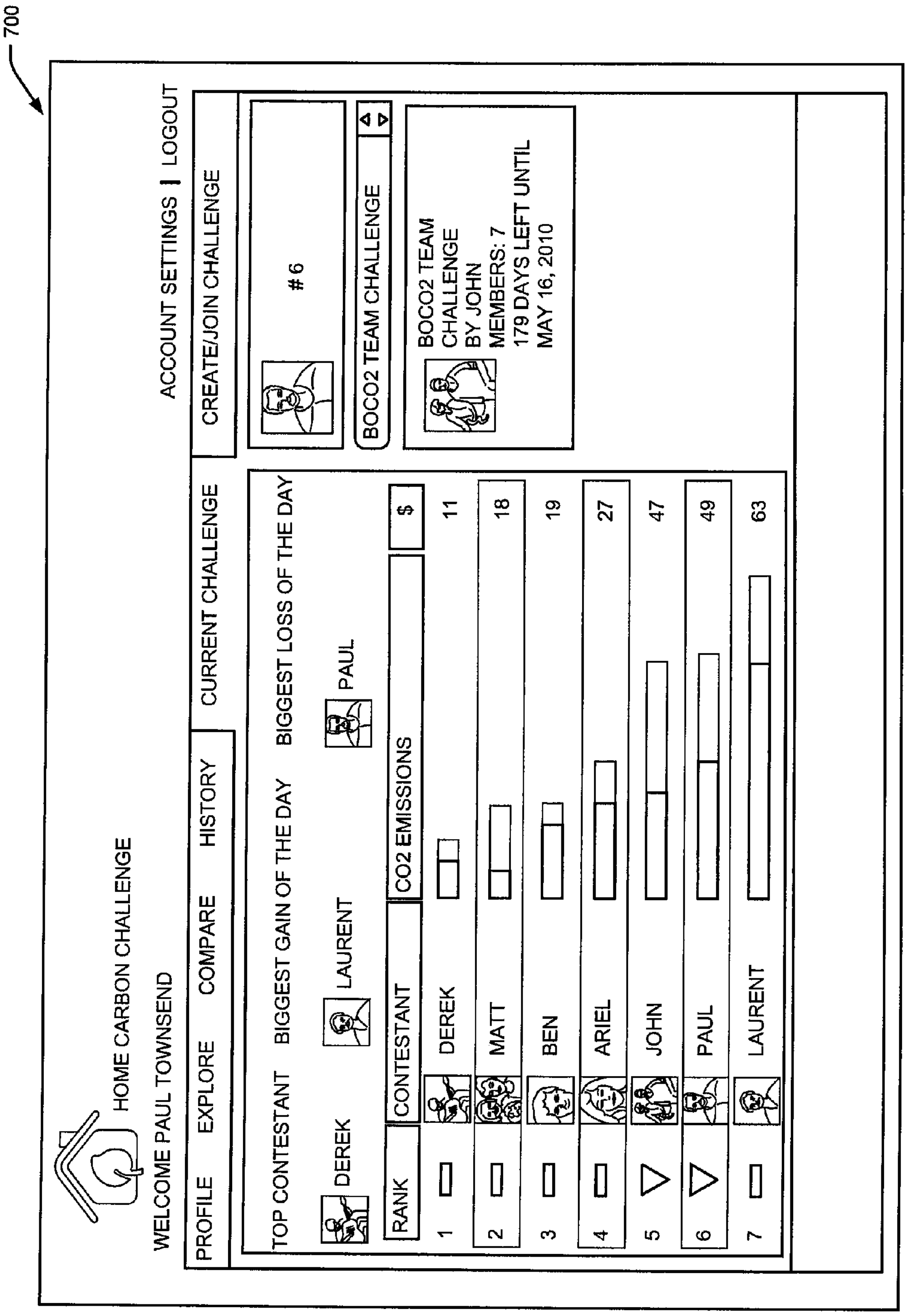
FIG. 7 is a GUI depicting another carbon footprint comparison, in accordance with an embodiment.

FIG. 7 is a GUI 700 depicting another carbon footprint comparison, in accordance with an embodiment. As depicted, the GUI 700 displays the carbon footprint of various users participating in a carbon footprint challenge. In particular, the average carbon footprint of each user in the challenge is displayed, and such carbon footprints can be ranked based on the carbon footprint value. In an alternate embodiment, GUI 700 may instead depict users selected from a group that is identified to have similar or identical strength of match. For example, the users or carbon footprints of the users can be filtered such that only users that have a high strength of match are displayed in the GUI 700. In another example, the users can be filtered such that only users that have a low strength of match are displayed in the GUI 700.

It should be appreciated that any number of suitable layouts may be designed for region layouts illustrated above as FIGS. 1, 6, and 7 do not represent all possible layout options available. The displayable appearance regions included in a GUI can be defined by any suitable geometric shape (e.g., rectangle, square, circle, triangle, etc.), alphanumeric character (e.g., a, b, 6, 7, etc.), symbol (e.g., Δ, ∞, etc.), shading, pattern (e.g., hatched, solid, etc.), and color. Furthermore, for example, region 104 depicted in FIG. 1, or any other regions, may be omitted or dynamically assigned. It should be appreciated that the regions can be fixed or customizable. Additionally, each computing devices may have a fixed set of layouts, utilize the defined protocol or language to define a layout, or an external structure can be reported to the computing device that defines a layout. Finally, clicking on the region of graphic user interface as discussed above may trigger code to cause the functionality described herein.

Figure 8:
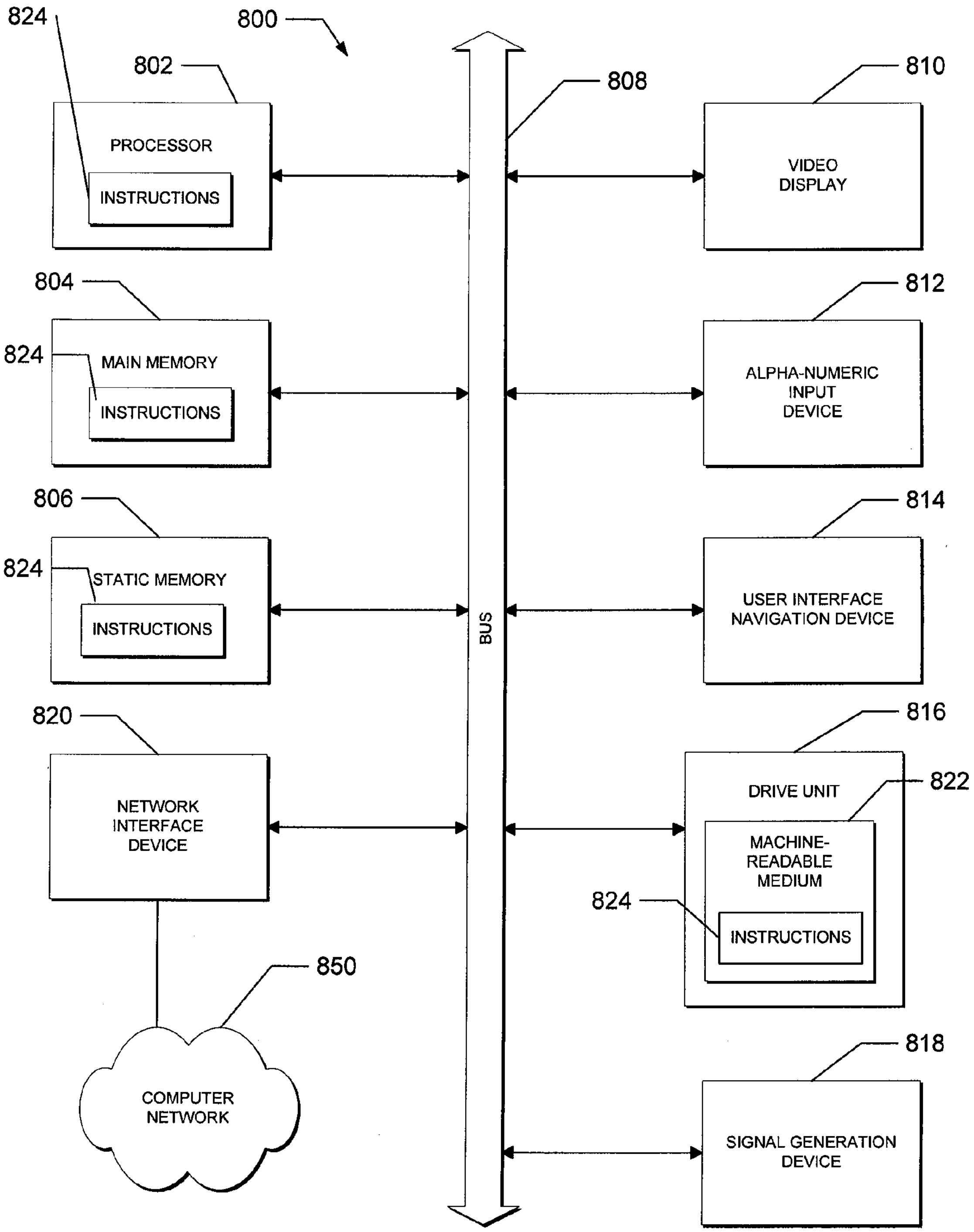
FIG. 8 depicts a block diagram of a machine in the example form of a computing device within which may be executed a set of instructions for causing the machine to perform any one or more of the methodologies discussed herein.

FIG. 8 depicts a block diagram of a machine in the example form of a computing device 800 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term “machine” shall also be taken to include any collection of machines that individually or jointly execute a set (or multiple sets) of instructions to perform any one or more of the methodologies discussed herein.

The example of the computing device 800 includes a processor 802 (e.g., a central processing unit (CPU), a graphics processing unit (GPU) or both), a main memory 804 (e.g., random access memory) and a static memory 806 (e.g., static random-access memory), which communicate with each other via a bus 808. The computing device 800 may further include a video display unit 810 (e.g., a plasma display, a liquid crystal display (LCD) or a cathode ray tube (CRT)). The computing device 800 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

The disk drive unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804 and/or within the processor 802 during execution thereof by computing device 800, with the main memory 804 and processor 802 also constituting machine-readable, tangible media.

The data structures and instructions 824 may further be transmitted or received over a computer network 850 via network interface device 820 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 800) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term “hardware module” should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 802 configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine, but deployed across a number of machines. In some example embodiments, the processors 802 may be located in a single location (e.g., within a home environment, an office environment or as a server farm), while in other embodiments, the processors 802 may be distributed across a number of locations.

While the embodiment(s) is (are) described with reference to various implementations and exploitations, it will be understood that these embodiments are illustrative and that the scope of the embodiment(s) is not limited to them. In general, techniques for analysis of carbon footprints may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of providing a carbon footprint comparison, the method comprising:
- accessing first profile attributes and a first carbon footprint of a first user, each of the first profile attributes defining a mode of living of the first user that cause emissions of greenhouse gases;
- accessing a carbon footprint and profile attributes of additional users, each of the profile attributes defining a mode of living of each of the additional users that cause emissions of greenhouse gases;
- determining that the first user and each of the additional users are a match based on identifying a number of matching profile attributes from the first profile attributes and the profile attributes of each of the additional users;
- determining a match strength value for the first user and each of the additional users, the determining of the match strength value comprising:
  - accessing a list of predefined strength values and a set of available profile attributes corresponding to each of the predefined strength values;
  - counting the identified matching profile attributes included in the set of available profile attributes; and
  - comparing the count to the list of predefined strength values;
- determining that the match strength value for the first user and each of the additional users is identical;
- calculating an average group carbon footprint corresponding to a group of users with the match strength value based on the carbon footprint of each of the additional users; and
- presenting a comparison of the first carbon footprint with the calculated group carbon footprint corresponding to the group of users with the match strength value.

2. The method of claim 1, wherein the determining that the first user and each of the additional users are a match comprises:
- comparing a profile attribute from the first profile attributes with an additional attribute from the profile attributes of each of the additional users; and
- identifying the profile attribute to match the additional attribute.

3. The method of claim 1, wherein the determining that the first user and each of the additional users are a match comprises:
- comparing a profile attribute from the first profile attributes with a predefined range;
- comparing an additional profile attribute from the profile attributes of each of the additional users with the predefined range; and
- identifying the match based on the profile attribute and the additional attribute being in the predefined range.

4. A computing device comprising:
- at least one processor; and
- a memory in communication with the at least one processor, the memory being configured to store a carbon footprint analysis module that is executable by the at least one processor, the carbon footprint analysis module having instructions that when executed by the at least one processor, cause operations to be performed, the operations comprising:
- accessing first profile attributes and a first carbon footprint of a first user, each of the first profile attributes defining a mode of living of the first user that cause emissions of greenhouse gases;
- accessing a carbon footprint and profile attributes of additional users, each of the profile attributes defining a mode of living of each of the additional users that cause emissions of greenhouse gases;
- determining that each of the additional users are a match to the first user based on identifying a number of matching profile attributes from the first profile attributes and the profile attributes of each of the additional users;
- determining a match strength value for the first user and each of the additional users, the determining of the match strength value comprising:
  - accessing a list of predefined strength values and a set of available profile attributes corresponding to each of the predefined strength values;
  - counting the identified matching profile attributes included in the set of available profile attributes; and
  - comparing the count to the list of predefined strength values;
- determining that the match strength value for the first user and each of the additional users is identical;
- calculating an average group carbon footprint corresponding to a group of users with the match strength value based on the carbon footprint of each of the additional users; and
- presenting a comparison of the first carbon footprint with the calculated group carbon footprint corresponding to the group of users with the match strength value.

5. The computing device of claim 4, wherein the operation of determining that the first user and each of the additional users are a match comprises:
- comparing a profile attribute from the first profile attributes with an additional attribute from the profile attributes of each of the additional users; and
- identifying the profile attribute to match the additional attribute.

6. The computing device of claim 4, wherein the operation of-determining that the first user and each of the additional users are a match comprises:

comparing a profile attribute from the first profile attributes with a predefined range;

comparing an additional profile attribute from the profile attributes of each of the additional users with the predefined range; and identifying the match based on the profile attribute and the additional attribute being in the predefined range.

7. A non-transitory machine-readable medium that stores instructions, which, when performed by a machine, cause the machine to perform operations comprising:

accessing first profile attributes and a first carbon footprint associated with a first user;

identifying a number of the first profile attributes corresponding to a set of available profile attributes comprising a predefined strength;

constructing a search query based on the number of the first profile attributes;

identifying additional users based on the search query, each of the additional users being associated with a set of profile attributes defining a mode of living of each of the additional users that cause emissions of greenhouse gases;

accessing a carbon footprint for each of the additional users;

determining that the first user and each of the additional users are a match based on identifying a number of matching profile attributes from the first profile attributes and the profile attributes of each of the additional users;

determining a match strength value for the first user and each of the additional users, the determining of the match strength value comprising:

accessing a list of predefined strength values and a set of available profile attributes corresponding to each of the predefined strength values;

counting the identified matching profile attributes included in the set of available profile attributes; and comparing the count to the list of predefined strength values;

determining that the match strength value for the first user and each of the additional users is identical;

calculating an average group carbon footprint corresponding to a group of users with the match strength value based on the carbon footprint of each of the additional users; and presenting a comparison of the first carbon footprint with the calculated group carbon footprint corresponding to the group of users with the match strength value.

8. The non-transitory machine-readable medium of claim 7, further comprising repeating each of the operations for a next predefined strength.

9. The non-transitory machine-readable medium of claim 7, wherein the operation of identifying the number of the first profile attributes comprises:

accessing matching profile attributes associated with the predefined strength;

comparing the first profile attributes with the matching profile attributes; and identifying the number of the first profile attributes to match matching profile attributes based on the comparison.

10. The non-transitory machine-readable medium of claim 7, wherein the first carbon footprint is a measure of greenhouse gas emissions caused by the first user.

* * * * *